United States Patent [19]

Withers et al.

[11] 4,431,503
[45] Feb. 14, 1984

[54] ENERGY REDUCTION IN THE MANUFACTURE OF PRE-BAKED CARBON CONTAINING ELECTRODES FOR ELECTROLYTIC PRODUCTION OF METALS SUCH AS ALUMINUM

[75] Inventors: James C. Withers, Tucson, Ariz.; Gary V. Upperman, North Olmsted, Ohio

[73] Assignee: Metallurgical, Inc., Edgewater, Ohio

[21] Appl. No.: 275,940

[22] Filed: Jun. 22, 1981

[51] Int. Cl.³ .................. C25B 11/02; C10L 5/22; B28B 17/00
[52] U.S. Cl. ................................. 204/294; 44/14; 264/109; 425/812
[58] Field of Search ............... 204/284, 294; 44/14; 264/109; 425/812

[56] References Cited

U.S. PATENT DOCUMENTS

| | | | |
|---|---|---|---|
| 1,780,205 | 11/1930 | Maurel | 44/14 |
| 2,011,971 | 8/1935 | Erickson | 44/14 |
| 2,582,764 | 1/1952 | Bailey | 423/449 |
| 3,389,200 | 6/1968 | Olstowski et al. | 264/105 |
| 3,619,286 | 11/1971 | Gutnajer | 204/294 X |
| 3,772,201 | 11/1973 | Mills | 204/277 |
| 3,930,968 | 1/1976 | Cramer et al. | 204/74 |
| 4,401,615 | 8/1983 | Gerhardson | 204/119 |

FOREIGN PATENT DOCUMENTS 510256  7/1939  United Kingdom .

*Primary Examiner*—F. Edmundson
*Attorney, Agent, or Firm*—Laurence R. Brown

[57] ABSTRACT

Carbon containing electrodes are made with a considerable reduction of energy over conventional methods for use in the aluminum industry and the like that have the strength, density and control of dimensional shape necessary for an electrode withstanding the considerable thermal, electromagnetic and chemical forces encountered in the electrolytic production of metals such as aluminum.

Thus, the manufacturing process forms the green electrode materials of carbon powder or a carbon-alumina, etc. mixture and mixed with a binder comprising a liquid thermo-setting resin which is pre-cured under pressure to form a hardened stable electrode form that does not droop during coking or require support. Savings of energy here results by eliminating a heat cure step and in a reduced coking volume and time for such electrodes. Preferably the coking takes place in a tunnel kiln to further reduce energy by heating substantially only the electrodes.

Coking times for such electrodes are further significantly reduced from the usual 2 days coking cycle with several days of controlled warmup getting the furnace to the maximum temperature and may be only a few hours particularly when indented slots or holes are provided in the green electrodes to minimize path lengths for escape of volatiles during coking. This permits a much faster warmup cycle and a much shorter overall coking period to save additional significant amounts of energy.

Thus both faster heating rates to achieve maximum coking temperatures and shortened coking times required at peak heats are afforded by this invention. Further energy saving improvement is afforded by use of metallic or graphite heat conductors positioned in the holes or slots during coking.

9 Claims, 6 Drawing Figures

U.S. Patent  Feb. 14, 1984  4,431,503
FIG.1
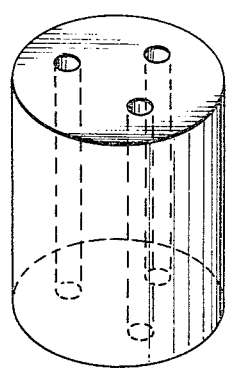
FIG.2
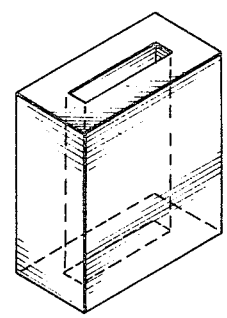
FIG.3
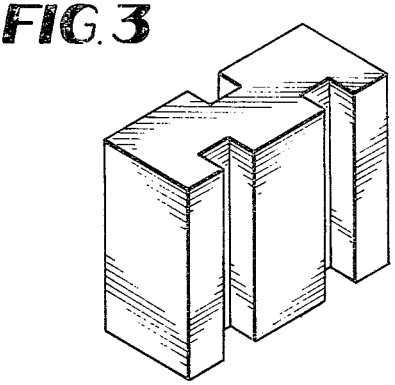
FIG.4
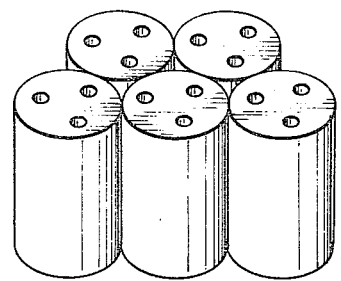
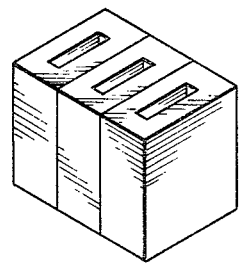
FIG.5
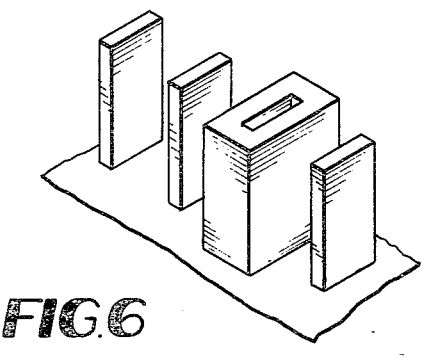
FIG.6

ENERGY REDUCTION IN THE MANUFACTURE OF PRE-BAKED CARBON CONTAINING ELECTRODES FOR ELECTROLYTIC PRODUCTION OF METALS SUCH AS ALUMINUM

TECHNICAL FIELD

This invention relates to means and methods for saving energy in the manufacturing of pre-baked carbon containing electrodes to produce characteristics compatible with the electrolytic production of metals, such as aluminum, and more particularly it relates to techniques for molding and baking preformed anode bodies in much shorter baking time cycles than heretofore feasible thereby significantly decreasing both the energy expended and the manufacturing time of the prior art.

BACKGROUND ART

Carbon containing anodes used in the electrolytic production of metals, such as aluminum, must have special properties to withstand the operating conditions. Thus, one problem exists because the molten halide electrolytes generally used are at temperatures of 700° C. or higher providing significant temperature gradient problems and thermal shock on startup and because of the very short distance transition zone between cooler temperatures and the molten electrolyte. Another problem exists because of the very high current flow, which can exceed 10,000 amperes, and which induces corresponding high electric field stresses which can cause an electrode to crack or crumble. These problems are compounded because the anodes in the aforesaid environmental conditions are consumed in the electrolytic process and thus must have carefully controlled physical and chemical characteristics. For example, any water therein would cause crumbling, etc. The problems are even more acute when special anode mixtures such as $Al_2O_3$ and carbon are used as in some processes for producing aluminum, because of higher electrical resistivities and different chemical bonding relationships in the anode and chemical consumption processes in the production of the aluminum, etc. metal. Accordingly, the manufacture of all these electrodes is critical.

Generally stated two classes of electrolytic anodes for production of aluminum have been used, namely the pre-baked or precured class and self-baking or self-curing class sometimes known as Soderburg anodes. This invention is directed to the pre-baked type of anodes.

The most relevant prior art techniques representative of the state of the art prior to this invention is related in B. L. Bailey—U.S. Pat. Nos. 2,582,764—Jan. 15, 1952. Thus, screened uncalcined petroleum cokes are mixed at a critical elevated temperature of 150°–325° F. with an aromatic compound liquid plasticizer such as nitrobenzene or furfural with or without added pitch or tar and formed into an electrode by molding at a pressure about 2,000 psi. Then the formed anodes are fired in a furnace at 1740° F. for eight days, removed and graphitized at 5070° F.

As shown in C. B. Willmore—British Pat. No. 510,256 the "green" electrodes need be supported in coke dust, etc. during baking to prevent slumping or changes in shape even when forming pressures up to 15,000 psi are used. In this patent the initial cold shaping and pressure steps are undertaken without the application of heat. Thus there is a problem in the retention of shape and prevention of slumping during the baking step.

One problem during the baking step is the tendency of the anode to fracture or develop cracks. One of the reasons for this is that the vapors released from the binders mixed in the anode need to escape. This problem is discussed in J. Walker—U.S. Pat. No. 2,822,328—Feb. 4, 1958 as related to self-baking electrodes. However, in pre-baked electrodes, the escape of volatile vapors can lead to rejects because of cracks or loss of density, etc. High density and high physical strength are necessary properties of these electrodes.

The most serious problem of all is the energy consumption required in the manufacture of the electrodes. Higher energy costs and shortages of fossil fuels has changed the requirements of the industry to a search for more energy efficient methods. As may be seen from the hereinbefore recited typical prior art manufacture of carbon containing electrodes, baking cycles of eight or more days and up to twenty-one days in practice are required in ovens reaching temperatures of the order of 2000° F. Other energy is required in pre-bake or heat cycles, etc. It is evident that any substantial decrease in the energy required in such prior art manufacturing techniques would constitute a significant advance of the state of the art, provided of course, that the critical characteristics of the electrodes for use in the demanding environments of molten halide salt electrolytes, and the like, may be retained.

Thus it is an object of this invention to resolve the aforesaid problems in the art and to provide improved energy saving techniques for the manufacture of carbon containing electrodes suitable for critical use in the electrolytic production of metals, such as aluminum.

Other objects, features and advantages of the invention will be found throughout the following description, drawings and claims.

DISCLOSURE OF THE INVENTION

Pre-baked consumable electrodes, typically anodes of carbon or carbon-metal oxide mixtures used in the electrolytic production of aluminum and other metals in a molten halide containing electrolyte operable above 600° C. are made with significantly reduced energy while retaining desired density, strength and shape.

An initial binder of a liquid form thermo-setting resin is mixed at room temperature with the electrode raw material(s) and a low temperature pre-curing step hardens the electrode in its end shape so that it will stand alone in a further coking step.

The initial resin binder may be mixed with conventional pitch or tar binders before the pre-curing hardening step. In such cases the curing temperature of the thermo-setting resin is preferably at a lower temperature than that at which the pitch or tar softens.

The mixture is molded under pressure for obtaining high density either in green form or during the pre-curing step. While this step may be at moderate temperatures, cold pressing further saves energy.

A significant reduction of coking time for the molded electrodes and corresponding energy savings is attained by forming the electrode shapes to have shapes, or holes or slots therein disposed to permit the escape of volatiles from the resin, tar and pitch binders during coking over a shortened path through the electrode.

Thus, high performance special purpose electrodes suitable for use in electrolytic production of aluminum, etc. are produced over shorter manufacturing times with less energy. Further objects, features and advantages are found throughout the following description, drawings and claims.

BRIEF DESCRIPTION OF THE DRAWINGS

In the drawings:

FIGS. 1 to 3 are sketches representing green electrode shapes afforded by this invention;

FIGS. 4 and 5 are sketches representing unsupported stacked electrodes ready to be coked; and FIG. 6 is a sketch representing the technique of baking the electrodes in an energy saving mode.

PREFERRED EMBODIMENTS OF THE INVENTION

A critical factor in the electrolytic production of aluminum and other like metals using molten halide electrolytic solutions at high temperatures is physical stability of the electrodes. Thus, for example, carbon or carbon-alumina mixture anodes used in different electrolytic processes for producing aluminum must not change shape, crack, crumble or otherwise become physically unstable when subjected to the very high physical stresses imposed by electromagnetic forces induced at very high current flows, chemical reactions and erosions incurred in the aluminum production cycle, and thermal stresses of shock and expansion induced by changing temperatures and by transition from low to very high temperatures over the necessary short anode distance traversed within and without the electrolyte. Thus, it is important to have dehydrated and devolatized anodes, since release of water and gases under such stresses can result in cracking or crumbling. This leads to a preference of pre-baked electrode structures carefully prepared to provide high strength, high density and close shape dimensions, particularly when used under conditions where the electrodes are fed, changed or positioned during the electrolytic production process.

Thus, the art has developed very long baking cycles and critical manufacturing techniques for such electrodes. Green anodes having appropriate raw material mixtures of anode materials (carbon alone or mixed with alumina) with resins or binders are prepared by molding under pressure generally at elevated temperatures before being coked in ovens with carefully controlled high temperatures. The ovens take a week or more to reach maximum temperatures for typically twelve or twenty days overall coking time. Thus all binders are volatized and removed and the carbon is coked to form strong, dense electrode bodies at the cost of considerable energy expenditures.

It has not been known how to significantly reduce these energy expenditures without such deterioration of the quality of the electrodes that cracking, crumbling or loss of shape would result or other changes that would prevent acceptable electrode operational characteristics in the electrolyte environment. Otherwise, lower energy solutions would have been adopted with the significant present cost of energy and the incentives to reduce energy in such industries as the aluminum industry where a large percentage of total industrial energy is expended. As will be seen, however, this invention provides an unexpected advance in the art by greatly reducing energy requirements in the provision of the electrodes consumed extensively in the electrolytic production of aluminum, and the like.

Thus, carbon electrodes such as electrolytic anodes for the aluminum industry have blended size carbon powder, preferably from petroleum coke as the principal constituent, usually 70% to 80% by weight in the green anode. Calcined coke is preferable but is more costly. The remainder is a binder which can be a finely divided pitch, preferably with a softening temperature greater than 100° C., thoroughly mixed with the carbon powder.

For those processes requiring an anode of mixed carbon and alumina or like ore or oxide, the same procedure holds except that the original mixture is the desired ratio of powdered and intimately mixed carbon and alumina particles, etc.

However, it is preferred in accordance with this invention to use in entirety or in a portion with the pitch, a non-viscous liquid (at room temperature) thermo-setting resin in the range of 2% to 18% by weight of the green anode. Phenolics, furfural, furan resins, furfuryl alcohol, cyclohexanene and mixtures of thereof are suitable. These resins cure at temperatures between 50° to 300° C. It is particularly desirable to choose a resin which cures at a temperature less than the softening point of the pitch component when pitch is used.

This step permits mixing at room temperatures thereby saving part of the processing energy required when the mixture otherwise must be heated in the mixing process. The low curing temperature saves energy. Also this permits the electrodes to be cured to a rigid solid prior to the baking step so that they need not be supported in the coking ovens and will not slump or change shape during coking. Contrast this with methods mixing the anode materials with heated liquid pitch and molding while hot. Energy is expended by heating the pitch but worse the pitch will go through a liquid phase in its conversion to a volatile gas during baking for coking. Thus the molded anode will relax and slump and change in density so that maximum strength and close form tolerances cannot be achieved. These disadvantages are precluded by the transformation of the resinous binder at low temperatures to a solid.

It is a preferable criterion to select a resin of low viscosity at room or mixing temperature to wet all electrode carbon particles with or without oxides by the resin. This assures for coking that there is a continuous carbon binding phase that results in a strong dense electrode capable of withstanding the significant electrolysis forces from temperature, temperature changes, electromagnetic currents and the electrolysis or chemical reactions without crumbling or cracking.

Preferably to attain higher density electrodes the curing is accomplished in a mold under pressure. However, the cold pressed green anode may be removed from the mold and cured elsewhere, if desired.

The major savings of energy comes by increasing the heating rate of the anodes. This heating rate is found by this invention to be a function of the path length taken by the volatiles to leave the electrode during the coking process. Thus, the electrode bodies are supplied with holes or slots positioned to shorten the exit routes. Preferably, shorter path lengths are provided by supplying a plurality of holes in or through an electrode body before coking to make the baking rate much more rapid. Such holes or slots are molded or extruded into green electrode bodies to be baked or are drilled in after the molding and/or curing operation.

It is important to obtain a high density in the green electrode. Thus, pressure during molding is applied and application of heat during molding can cure the binders to the extent that relaxation during coking does not occur.

Baking is preferably conducted in a tunnel kiln. The hardened green anode need not be supported by a coke packing as is otherwise conventional in the art. This alone assures more energy efficiency in the baking process, and the tunnel kiln is faster and more economical than traditional ring furnaces operating at about 1200° C. Thus, only the electrodes are heated not supporting refractories and coke powder which is of greater mass than the actual electrodes being coked. The heating time to reach maximum temperature is thus considerably reduced from the six to twelve days in ring furnaces.

It has been found that particularly with carbon-oxide electrode mixtures operating in electrolytes at about 700° C., coking temperatures need be no higher than 1000° C.

The heating rate, which is dependent upon the electrode dimensions establishing the path length through which the volatiles exit the electrode, is increased by doubling or quadrupling simply by making narrow dimensions, slots or holes providing shortened path distances for escape of volatiles, preferably with resulting path lengths not more than a few centimeters. This shaping also speeds the coking rate.

FIGS. 1 to 3 show various structural configurations of the electrode structures permitting significant energy savings. Thus, FIG. 1 shows a cylindrical electrode with indentations comprising several axial holes through the electrode placed therein before coking to shorten the escape routes for volatiles.

FIG. 2 shows a thin or rectangular shape with a through slot to both use an aspect ratio and the slot to shorten volatile escape route distances.

FIG. 3 shows a further alternate wherein slots extending into but not through the electrode body serve the same purpose.

FIGS. 4 and 5 schematically show the stacking of electrodes for coking without supporting coke, etc.

FIG. 6 shows a further technique for reducing energy, namely the conduction of heat into the electrodes by metallic or graphite heat conducting rods placed into the hole structures to the electrodes. The fit is loose enough to permit escape of volatiles, and serves to accelerate the heating rate and reduce coking energy by conducting heat into the interior of the anodes with good heat conductors. By contrast the electrode materials tend to be poorer heat conductors, particularly when ceramic type oxides such as $Al_2O_3$ are used in the electrode body. The heat conductors are preferably graphite or pure metals which resist carbide formation and melt above the coking temperature, such as copper and nickel, or alloys thereof.

The examples set forth hereinafter show the effects of the various energy saving techniques afforded by this invention upon the electrode structures. Evaluation is based upon structural integrity, absence of cracks, slump, porosity and density. Comparisons are made of hot pressing and cold pressing modes. In the examples the criterion G (good) is used to indicate a dense intact strong structure with no cracks or slumping. F (fair) is used to indicate substantially intact strong structure of less density having some porosity or hairline fissures. P (poor) shows low strength, large cracks and other structural defects.

The electrodes were formed in three inch (7.5 cm) diameter molds with a pressure load between 30 to 100 tons (8500 psi—28000 psi). In the hot press, the temperature was raised to about 100° C. while under pressure. When set, the electrode was cooled, removed from the mold and thereafter coked to 1100° C. Holes were drilled prior to the coking step.

The cold pressing mode proceeded as above without application of heat. Holes were drilled after pre-curing prior to coking.

The anodes below listed contained 720 grams coke, 108 grams pitch and 130 grams liquid phenolic binder. Three holes of diameters of ¼" (0.6 cm) were spaced 1 inch (2.5 cm) between centers, as shown in FIG. 1.

EXAMPLE 1

Hot Pressed—8500 psi

| Coking Times | Solid | With Holes |
| --- | --- | --- |
| 6 hours | P | P |
| 12 hours | P | F |
| 24 hours | P | G |
| 48 hours | F | G |

EXAMPLE 2

Cold Pressed—8500 psi

| Coking Times | Solid | With Holes |
| --- | --- | --- |
| 6 hours | F | G |
| 12 hours | G | G |
| 24 hours | G | G |
| 48 hours | G | G |

EXAMPLE 3

Hot Pressed—28000 psi

| Coking Times | Solid | With Holes |
| --- | --- | --- |
| 6 Hours | P | P |
| 12 hours | P | P |
| 24 hours | P | F |
| 48 hours | P | G |

EXAMPLE 4

Cold Pressed—28000 psi

| Coking Times | Solid | With Holes |
| --- | --- | --- |
| 6 hours | P | F |
| 12 hours | F | G |
| 24 hours | G | G |
| 48 hours | G | G |

It is noted that the cold pressed electrodes were better in general shape and appearance than the hot pressed anodes but were from 3 to 8% lower in density. The density increased slightly in those electrodes with holes. Also it was noted that the beneficial effect of the holes on the higher density hot pressed anodes was greater showing the effect of reduction of volatile escape path length.

Similar procesures and dimensions were used to produce composite electrode structures with intermixed carbon and $Al_2O_3$ with the following thoroughly mixed constituents: 950 grams $Al_2O_3$, 364 grams phenolic liquid binder, 61 grams pitch and small quantities of additives such as poly ox or $H_3BO_3$.

EXAMPLE 5

Hot Pressed—8500 psi—200° C.

Holes drilled as above in cured electrode. Coking for 12 hours at 1100° C. produced a single structure with numerous radial cracks. A similar electrode without holes cracked into several pieces.

EXAMPLE 6

Same as 5 with 24 hours coking cycle. The electrode with holes was intact but somewhat porous. The one without holes had severe radial cracks.

EXAMPLE 7

Same as 5 with 48 hours coking cycle. The electrode with holes was intact and dense. The one without holes had severe and fine radial cracks.

Simple analysis of these examples and comparison with prior art techniques now conventional in the state of the art show that electrodes can be manufactured with savings of most of the energy heretofore expended by reducing the coking time more than 50%.

It is to be noted that the technique of this invention exposes more surface area of the electrode being baked and coked to the heating medium, thus more efficiently and effectively using energy in the coking process.

Clearly the electrode configurations may have shapes, indentations and holes therein spaced and proportioned to produce the high density, high strength coked structure of precise shape without cracks, fissures or fractures, even when heated over faster heatup cycles. It is to be recognized in this respect that axially oriented holes entirely through a longitudinally shaped electrode provide a considerable improvement in reducing radial cracks and fissures in the baking process.

It is therefore evident that this invention has provided novel techniques which significantly decrease the energy expended in the manufacture of electrodes with carbon or carbon mixtures that are coked to provide the strength and density to withstand the rigors of electrolysis in molten halide salts to produce aluminum and like metals.

Therefore those features of novelty believed descriptive of the nature and spirit of the invention are defined with particularity in the appended claims.

Industrial Application

Savings of most of the energy heretofore required in standard manufacturing techniques for carbon containing coked electrodes used in the electrolytic process of the manufacture of aluminum, for example, is made possible by the simplified manufacturing techniques of this invention which also produce better control of shape and dimensions without significant deterioration of desired electrode characteristic properties.

We claim:

1. The energy efficient process of manufacturing high density carbon containing coked electrodes having a high ratio of metal oxide of the type used in electrolytic production of aluminum at about 800° C. to withstand thermal shock and electromagnetic field stresses without cracking in service and avoiding change in critical shape during manufacturing from evolving gases comprising the steps of:
   mixing the carbon containing metal oxide electrode raw materials together with a liquid thermosetting resin binder,
   shaping and curing the binder at a low temperature while under pressure to form a hardened self supporting stable green electrode shape having at least one slot to reduce the exit path length of the volatiles from the resin binder released in the coking step, and
   coking the hardened green electrode for a period of less than 48 hours at a high temperature to produce a dense strong electrode of a precise shape defined by the green electrode and devoid of cracks.

2. The process of claim 1 including the step of curing the binder while subjecting the mixed materials to pressure of at least 8500 p.s.i.

3. The process of claim 1 including the step of heating the binder to a temperature no more than 100° C. during the curing step.

4. The process of claim 1 including the step of mixing into the electrode raw materials a portion of pitch.

5. The process of claim 4 including the step of curing said resin at a temperature below the softening temperature of the pitch.

6. The process of claim 1 wherein the oxide is $Al_2O_3$.

7. The process of claim 1 including the step of transmitting heat to the electrode during the coking step by means of a heat conductive member disposed in said slot.

8. The process of claim 1 including the step of coking a plurality of side by side unsupported electrodes.

9. The process of claim 1 wherein the coking step takes place in a tunnel kiln.

* * * * *